US009477060B2

United States Patent
Sales Casals

(10) Patent No.: US 9,477,060 B2
(45) Date of Patent: Oct. 25, 2016

(54) WET MATEABLE CONNECTION ASSEMBLY FOR ELECTRICAL AND/OR OPTICAL CABLES

(71) Applicant: PRYSMIAN S.P.A., Milan (IT)

(72) Inventor: Lluis Ramon Sales Casals, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 14/767,809

(22) PCT Filed: Feb. 15, 2013

(86) PCT No.: PCT/IB2013/051227
§ 371 (c)(1),
(2) Date: Aug. 13, 2015

(87) PCT Pub. No.: WO2014/125333
PCT Pub. Date: Aug. 21, 2014

(65) Prior Publication Data
US 2015/0378125 A1    Dec. 31, 2015

(51) Int. Cl.
*G02B 6/38* (2006.01)
*G02B 6/44* (2006.01)
(Continued)

(52) U.S. Cl.
CPC ........... *G02B 6/4494* (2013.01); *G02B 6/3816* (2013.01); *G02B 6/3817* (2013.01); *H01R 13/5202* (2013.01); *H01R 13/523* (2013.01); *H01R 24/20* (2013.01); *H01R 24/28* (2013.01);
(Continued)

(58) Field of Classification Search
CPC  G02B 6/4494; G02B 6/3816; G02B 6/3817; H01R 13/5202; H01R 13/523; H01R 24/20; H01R 24/28; H01R 43/005; H01R 43/26; H01R 2107/00; H02G 1/10
USPC .......................................................... 385/56
See application file for complete search history.

(56) References Cited

U.S. PATENT DOCUMENTS 4,203,640 A * 5/1980 Bice ................... H01R 13/4532
439/139
4,874,326 A * 10/1989 Marolda, Jr. ........ H01R 13/523
439/273
(Continued)

FOREIGN PATENT DOCUMENTS

WO    WO 96/22554     7/1996
WO    WO 2014/125334  8/2014

OTHER PUBLICATIONS

A new technique for the deep-sea mating of inexpensive connectors by Beurthey; Nuclear Instruments and Methods in Physics Research Section A: Accelerators, Spectrometers, Detectors and Associated Equipment Volumes 626-627, Supplement, Jan. 11-21, 2011, pp. S124-S126.*

(Continued)

*Primary Examiner* — Ryan Lepisto
*Assistant Examiner* — Guy Anderson
(74) *Attorney, Agent, or Firm* — Finnegan, Henderson, Farabow, Garrett & Dunner, L.L.P.

(57) ABSTRACT

A wet mateable connection assembly includes: at least one first and a second watertight case mateable to each other in a watertight manner, the first and the second case having respective first and second gates at respective first and second coupling ends; at least one first phase connector arranged inside the first case; and at least one second phase connector arranged inside the second case, wherein the first gate is movable inwardly to the second case.

21 Claims, 10 Drawing Sheets

(51) Int. Cl.
*H01R 13/523* (2006.01)
*H02G 1/10* (2006.01)
*H01R 13/52* (2006.01)
*H01R 24/20* (2011.01)
*H01R 24/28* (2011.01)
*H01R 43/00* (2006.01)
*H01R 43/26* (2006.01)
*H01R 13/453* (2006.01)
*H01R 107/00* (2006.01)

(52) U.S. Cl.
CPC ............ *H01R 43/005* (2013.01); *H01R 43/26* (2013.01); *H02G 1/10* (2013.01); *H01R 13/4536* (2013.01); *H01R 2107/00* (2013.01)

(56) References Cited

U.S. PATENT DOCUMENTS

| | | | | |
|---|---|---|---|---|
| 4,909,751 A * | 3/1990 | Marolda, Jr. | ........ | H01R 13/523 439/273 |
| 5,470,248 A * | 11/1995 | Wood | ................... | H01R 13/523 439/271 |
| 5,645,438 A * | 7/1997 | Cairns | ................... | G02B 6/3816 439/139 |
| 5,704,799 A * | 1/1998 | Wood | ................... | H01R 13/523 439/271 |
| 5,722,842 A * | 3/1998 | Cairns | ................... | G02B 6/3816 439/139 |
| 5,738,535 A * | 4/1998 | Cairns | ................... | G02B 6/3816 439/138 |
| 5,873,750 A * | 2/1999 | Cairns | ................... | H01R 13/523 439/587 |
| 6,017,227 A * | 1/2000 | Cairns | ................... | G02B 6/3816 439/138 |
| 6,332,787 B1 * | 12/2001 | Barlow | .............. | H01R 13/5227 439/138 |
| 6,402,539 B1 * | 6/2002 | Toth | ...................... | H01R 13/523 439/138 |
| 6,543,965 B2 * | 4/2003 | Toth | ........................ | H02G 15/14 405/158 |
| 6,736,545 B2 | 5/2004 | Cairns et al. | | |
| 8,483,530 B2 * | 7/2013 | Sorensen | ............. | H01R 13/523 385/111 |
| 2003/0007738 A1 | 1/2003 | Cairns et al. | | |
| 2004/0074635 A1 * | 4/2004 | Collie | ..................... | E21B 29/08 166/85.1 |
| 2011/0130024 A1 * | 6/2011 | Cairns | ................... | H01R 13/523 439/271 |
| 2011/0265885 A1 * | 11/2011 | Singh | .................... | E21B 33/0355 137/15.01 |
| 2011/0278021 A1 * | 11/2011 | Travis | ................... | E21B 33/047 166/386 |

OTHER PUBLICATIONS

International Search Report from the European Patent Office for International Application No. PCT/IB2013/051227, mailing date Nov. 6, 2013.
Written Opinion of the International Searching Authority from the European Patent Office for International Application No. PCT/IB2013/051227, mailing date Nov. 6, 2013.

\* cited by examiner

WET MATEABLE CONNECTION ASSEMBLY FOR ELECTRICAL AND/OR OPTICAL CABLES

CROSS REFERENCE TO RELATED APPLICATION

This application is a national phase application based on PCT/IB2013/051227, filed Feb. 15, 2013, the content of which is incorporated herein by reference.

BACKGROUND OF THE INVENTION

1. Field of the Invention

The present invention relates to a wet mateable connection assembly for undersea applications.

In particular the present invention especially refers to a wet mateable connection assembly for electrical and/or optical cables.

In particular, the present invention especially refers to a wet mateable connection assembly for medium and high voltage electrical cables. Typically, by medium voltage cables we mean cables suitable for more than 1 kV and up to about 30 KV, and for high voltage cables we mean cables suitable for operating above about 30 kV.

2. Description of the Related Art

The oceanic/undersea energy generation is growing at a fast speed and in this field the technologies used to generate energy are dominantly "wind mills" but wave and tidal generators are showing some promising results.

The wind mills are generally built with fixed bottom structures and inter array cables are used to go from one turbine to the next.

In order to connect the wind mills or similar apparatus to an electric network, cables may be used, wherein the cable connections are "dry mate", i.e. the ends of the cables coming from the wind mills and of the cables of the electric network or of intermediate stations are connected together (i.e. are mated, or unmated, by means of appropriate connectors) in a dry environment, to avoid the presence of water at the connector interface, which may produce partial discharges and the consequent cable faults in the presence of electrical field and subsequently laid down underwater.

Cable hubs and/or cable substations can be used for connecting two or more underwater cables of an electric network. In these cases, and especially in places where water depths exceed 40 m depth, the dry mating is more cumbersome because it implies retrieving from underwater, for example to a ship, a sunken hub or substation having a significant weight.

The dry mating is often unpractical and generally economically disadvantageous.

In offshore windmills and other submarine applications, wet mateable connection assemblies are known.

The wet mateable connection assemblies are configured to allow the cable connection to be realized directly undersea.

Known wet mateable connection assemblies utilize an insulating liquid, such as oil, and sealing arrangements between male and female connector elements to exclude seawater from the connector interfaces. As disclosed, for example, by U.S. Pat. No. 6,736,545, such connectors generally comprise a plug unit containing one or more contact probes and a receptacle unit containing an equivalent number of contacts or junctions for engagement with the contact probes, which extend into the receptacle unit when the units are connected to each other. Typically, the contacts or junctions are contained in a sealed chamber containing dielectric fluid, and the probes enter the container via one or more openings which are sealed when the units are separated.

One major problem in designing such units is the provision of seals which will adequately exclude seawater from the phase connectors even after repeated mating and unmating, and also prevent dielectric fluid from leaking out of the chamber.

WO 96/22554 relates to underwater mateable connectors suitable for high-pressure applications and provided with a connector sealing mechanism for opening and closing a passage through a connector unit.

This mechanism comprises a moveable gate body. The gate body is moveable in a lateral direction within the connector.

The connector according to WO 96/22554 is also provided with two or dual elastomer seals, and also with an intervening chamber of dielectric fluid. In each unit, the elements to be joined are enclosed in the chamber, which is a sealed fluid-filled cavity, pressure balanced to the outside environment.

U.S. Pat. No. 4,203,640 relates to an improved electrical cable coupler which incorporates a rotatable protective cover on each coupler section to protect the electrical contacts and insulation against contamination when the coupler sections are disconnected and to allow the contacts to be electrically engaged when the coupler sections are connected together. Each protective cover includes one or more openings which correspond in number and location to the electrical contacts on its coupler section. Each disc is rotatable between a protective position in which its openings are out of alignment with the respective contacts to provide protection against contamination and an operative position in which the openings are in registration with the respective contacts to expose the contacts for electrical engagement.

SUMMARY OF THE INVENTION

The Applicant recognized the need for an improved wet mateable connection assembly which has a less complex construction and which provides reliable connection and disconnection, especially in harsh subsea environments.

In particular, the applicant has found that the presence of insulating fluids requires a complex arrangement to store and manage the insulating fluid and the use of such insulating fluid may not be as effective as required in case of multiple mating and unmating actions.

The Applicant found that a wet mateable connection assembly ensuring a water-free electric connection for submarine cables and allowing repeated mating and unmating actions can be made by providing an assembly in which an electric connector attached to a submersible cable is housed in a water-tight submersible case having a first closing gate, and an electric connector attached to a submersed cable is housed in a water-tight submersed case having a second closing gate, in which the first and second closing gates are arranged in complementary coupling interfaces such that, when the cases are coupled to each other, only a negligible amount of water may remain entrapped therebetween and in which the first closing gate is movable inside the submersed case to open communication between the submersible and submersed cases.

Preferably, the submersed case is active (i.e. has self-operating equipments, activated by an external power supply) and the submersible case is passive (i.e. its components have no operating means) and the connection of the electric connectors housed in the cases is actuated by the equipment arranged in the submersed case. This contributes to reduce the weight of the submersible case, simplifying the installation operations.

Within the present description, by submersed case we mean a case, connected with a relevant cable, intended to be laid on the seabed or in general in a submersed location, where it can remain during the life of the apparatus and relevant network to which it is attached; conversely, by submersible case we mean a case connected with a relevant cable which is sunken for mating or retrieved from underwater after unmating when the relevant cable is to be detached from the submersed fixed network.

In one aspect, the present invention concerns a wet mateable connection assembly comprising:
- a first and a second case watertight mateable to each other in a watertight manner, the first and the second case having respective first and second gate at respective first and second coupling end;
- at least one first phase connector arranged inside the first case;
- at least one second phase connector arranged inside the second case;

in which the first gate is movable inwardly to the second case.

Preferably, the first closing gate is movable around a pivoting axis substantially orthogonal to a longitudinal connecting axis.

In the present description and claims as "longitudinal connecting axis" is meant the axis along which the connection between the first phase connector/s and the relevant second phase connector/s takes place.

Preferably, the first phase connectors are fixed inside the first case facing the first coupling end, whereas the second phase connectors are movable from a distal position, where the second phase connectors are spaced from the second coupling end, to a connecting position where the second phase connectors extends through the second coupling end to reach the first phase connectors and to connect thereto.

The first and second cases are preferably cylindrical.

Preferably each coupling end comprises a flange with axis parallel to the axis of the respective case and surrounding an aperture.

Preferably, in the wet mateable connection assembly of the invention both coupling ends of said cases are provided with, respectively, a first gate, arranged at first coupling end, and a second gate, arranged at the second coupling end, both the gates being pivotable around a pivoting axis substantially orthogonal to the longitudinal connecting axis.

The connecting interface of each case of the present wet mateable connection assembly is formed by the relevant gate and flange. The gate and flange of one case are reciprocally positioned so as to provide a connecting interface substantially complementary to the connecting interface of the other case.

The first gate is advantageously abutting against a first flange and is shaped to close the aperture of the first coupling end.

Advantageously, the first gate is arranged in an axially external position with respect to the first case.

The second gate is advantageously arranged in an axially internal position with respect to the second case.

Thanks to the above advantageous positioning of the first and second gates, narrow hollow space between the coupling ends of the cases is left when the cases are tightly secured one another. As a consequence, a negligible amount of water remains entrapped therein.

At the gates opening, the water entrapped inside the hollow space during the securing step falls onto the receptacle case floor, leaving the mating passage and phase connectors dry.

In a preferred embodiment, both said gates can be pivotable around a pivoting axis orthogonal with respect to said longitudinal connecting axis. When both the gates are pivotable, they advantageously pivot in the same axial direction, orthogonal to the connecting axis.

The second gate can be opened/closed by moving in a direction perpendicular to the connecting axis.

Each gate can be provided with securing fittings suitable for keeping the gate watertight closed and operable for making the gate opened.

Advantageously, a pushing actuator is arranged inside the second case. This actuator is movable from a non-working position and a working position urging against the securing fittings of the first gate and causing the disengagement thereof from the first gate.

Preferably, the second phase connectors are mounted on a bearing structure inside the second watertight case.

Each phase connector is mechanically and electrically connected with an electric or optical or hybrid cable.

Preferably the cable is a three-phase cable. The phase connectors and the relevant cable phase are advantageously arranged in trefoil configuration.

Advantageously, the first and second phase connectors are supported by a relevant cage.

Advantageously, the first phase connectors are immersed in a curable material, for example an epoxy resin, inside the first watertight case. This material helps to prevent the water penetration and, when the phase connectors are more than one, provide further stability to the mutual configuration thereof.

Preferably, the first case is provided with a bend stiffener at the end opposite to its coupling end. The bend stiffener minimizes bending stress to the cable during installation and operation.

Preferably, the first case comprises a guide handle protruding substantially perpendicularly with the respect to the connecting axis. The guide handle can have a U or V shape or any other shape suitable for guiding the case in suspension along a rope for installation. The V shape is more preferred in that it can minimize oscillation of the first case while approaching the second case, thus helping the alignment and the connection of the cases.

Preferably, the second coupling end comprises a seat. Said seat is suitable to be associated with the guide handle of the first case for realizing a pivoting point between the first and the second case.

Advantageously, the second flange has an outer surface, provided with at least two centering studs protruding perpendicularly with respect to said outer surface. The centering studs are preferably conical.

Advantageously, the first flange has an outer surface provided with at least two stud seats.

Each centering studs of the second coupling end engages into a stud seat of the first coupling end and helps in aligning the first and second watertight case.

Advantageously, the wet mateable connection assembly comprises a plurality of sealing rings between said the coupling ends and the respective gates.

Preferably, the first and second cases are fixed to each other by a bolt-and-hole system provided in the flange of the first and second coupling ends.

In an embodiment of the invention, the second watertight case has two or more second coupling ends, each provided with a gate and with second phase connector. According this embodiment, a single second case can be mated with two or more first watertight cases.

In another aspect the present invention provides a method for underwater connecting two cable ends, the method comprising the steps of:
  providing at least one first phase connector in a first watertight case including a first gate at a first coupling end;
  providing at least one second phase connector in a second watertight case including a second gate at a second coupling end;
  securing the second case to the first case in a watertight manner by the respective first and second coupling end;
  opening the second, then the first gate, the first gate being opened by moving inward to the second case; and
  axially moving the second phase connector so as to engage the first phase connector and to operatively couple thereto.

As "to operatively couple" it is meant to establish an electrical or optical connection between phase connectors.

BRIEF DESCRIPTION OF THE DRAWINGS

The characteristics and advantages of a wet mateable connection assembly according to the present invention will become more apparent from the following by way of example and non-limiting description, with reference to the attached schematic drawings wherein.

With reference to the figures, an embodiment of a wet-mateable connector according to the present invention is shown with 10.

DETAILED DESCRIPTION OF THE INVENTION

Figure 1:
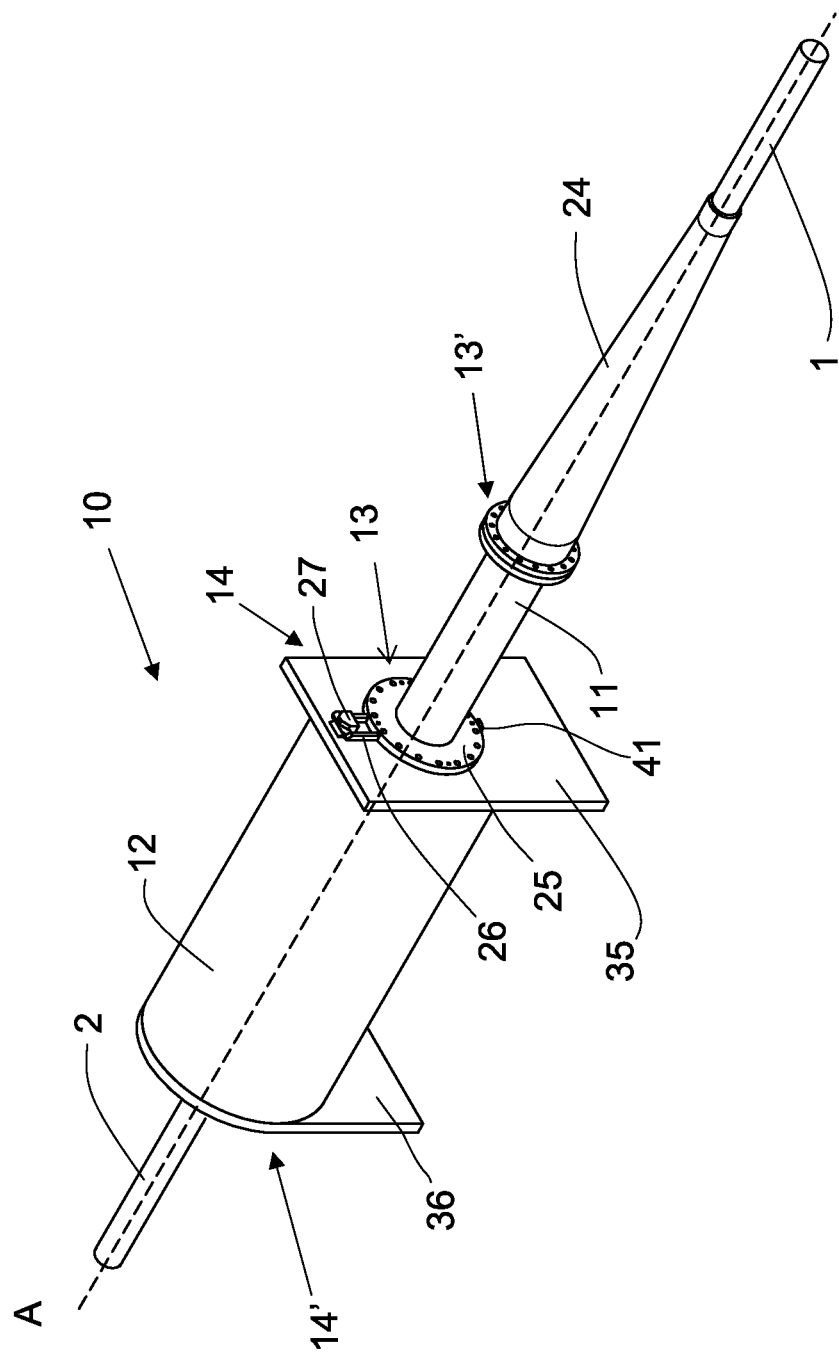
FIG. 1 is a perspective view of a wet mateable connection assembly according to the present invention.

With reference to the FIG. 1, the wet mateable connection assembly 10 comprises a first watertight case 11 with a cable 1 exiting therefrom and a second watertight case 12 with a cable 2 exiting therefrom, cases 11 and 12 being mated to each other in a watertight manner along a common longitudinal connecting axis A.

Each case 11, 12 comprises a respective first and second coupling ends 13, 14 which are intended to be adjoined to each other when the two cases are mated together as shown in FIG. 1. The coupling ends 13, 14 comprise respective substantially circular apertures perpendicular to the connecting axis A.

The first coupling end 13 of the first case 11 has a flange 25 having an axial aperture.

Each case 11, 12 comprises a respective first and second opposite end 13', 14' opposite to the first and second coupling end 13, 14.

The second coupling end 14 of the second case 12 has a flange 35 having an aperture. The flange 35 has preferably a straight side on its lower portion, so as to provide the second case 12 with a foothold for the positioning on, for example, the seabed.

The end 14' opposite to the coupling end 14 comprises a foothold 36 or the like for the positioning on the seabed.

The coupling end 13 of the first case 11 comprises a guide handle 26 associable with a seat 27 provided on the coupling end 14 of the second case 12.

The first case 11 comprises a bend stiffener 24 fixed to the opposite end 13', providing a smooth connection between the rigid first case 11 and the cable 1 connected thereto.

Figure 2:
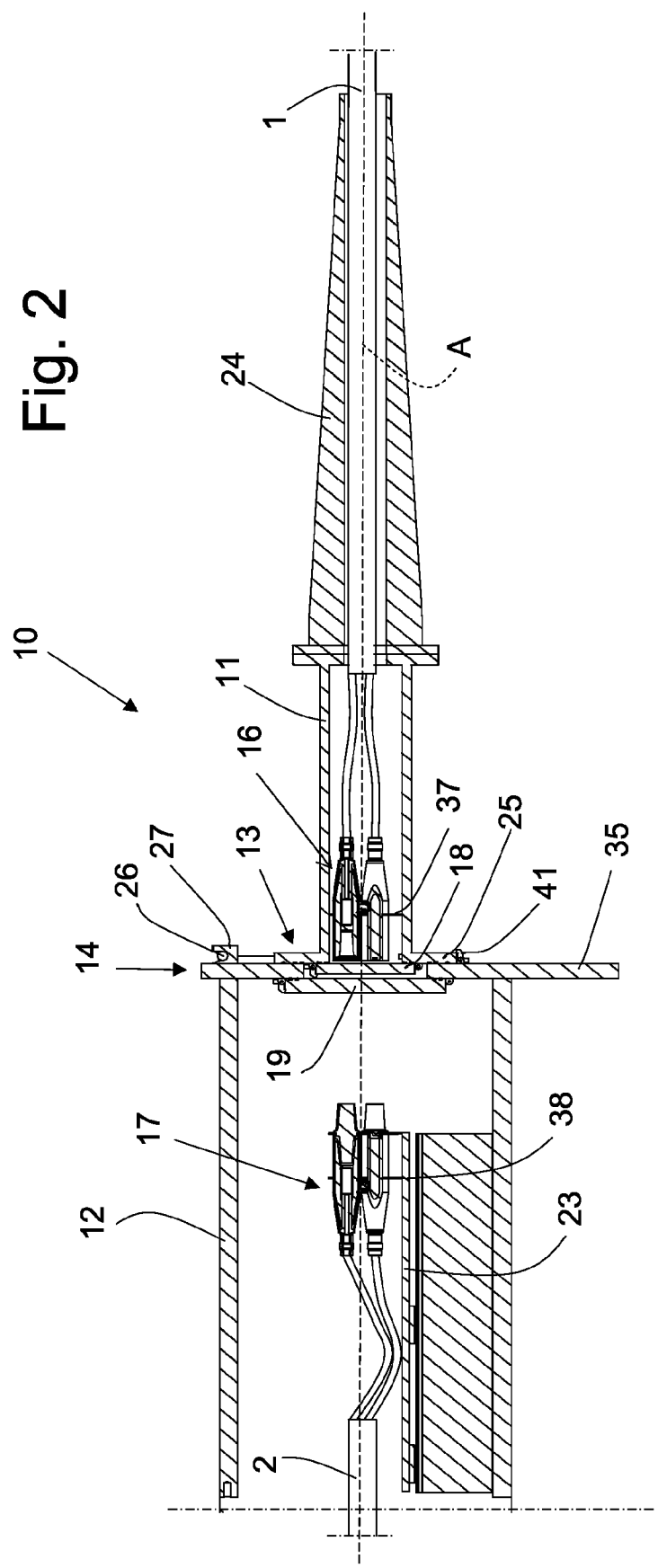
FIG. 2 is a sectional view of a wet mateable connection assembly of FIG. 1.
Figure 3:
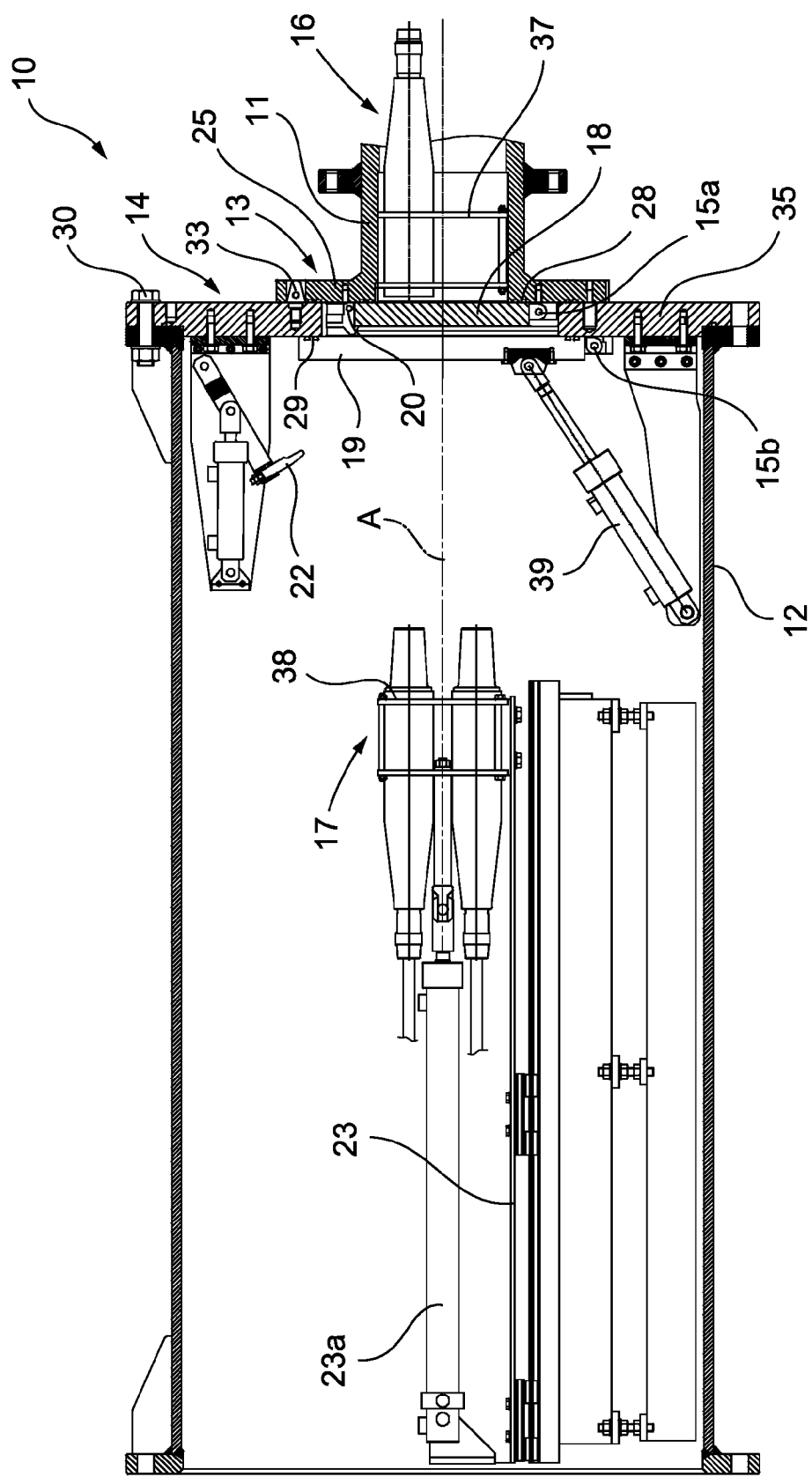
FIGS. 3-5 are sectional views of a wet mateable connection assembly of FIG. 1 showing the movements of the gates.

As shown in FIG. 2, the first case 11 houses first phase connectors 16, supported by a relevant cage 37 arranged inside the first case 11 and immersed in an epoxy resin; the phase connectors 16 are coupled to corresponding cables or to corresponding cable phases of a three phases cable 1.

The second case 12 houses second phase connectors 17 supported by a relevant movable cage 38.

The phase connectors 17 are coupled to respective cables or cable phases of a three phase cable 2.

The portion of the three phase cable 2 water-tightly housed in the case 12 has a length—for example 1-1.5 m—suitable to enable the movement of the phase connectors 17 from a distal position to a connecting position, as explained in detail hereafter.

Alternatively, the cables, or at least one or some of the cables, can be optical cables, and the connecting arrangement is configured accordingly.

Figure 6:
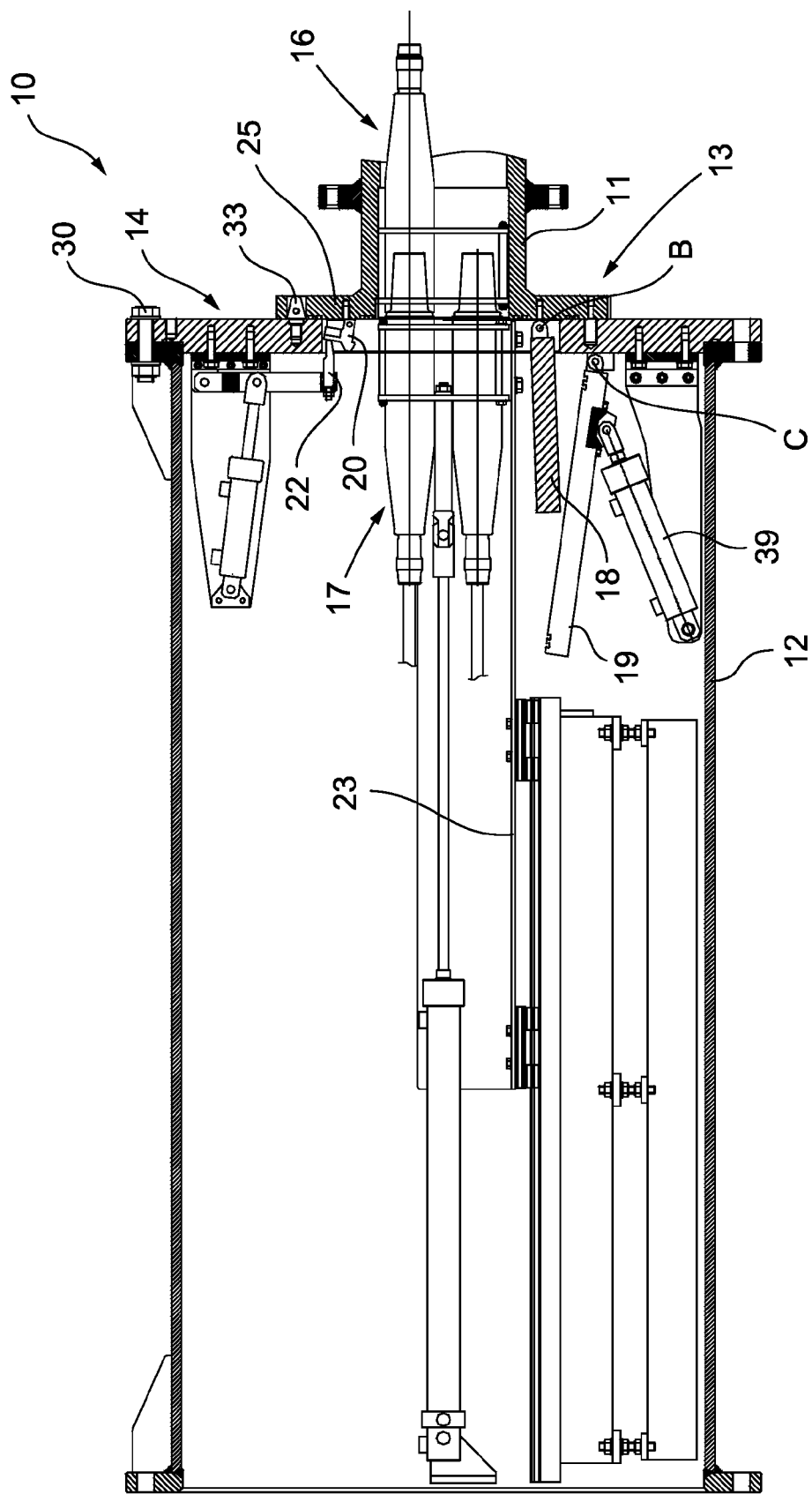
FIG. 6 is a sectional view of the mating between first and second phase connectors in a wet mateable connection assembly according to the invention.

The first phase connectors 16 are fixed with respect to the first case 11 to face the coupling end 13, while the second phase connectors 17 are movable from a distal position, where the second phase connectors 17 are spaced from the coupling end 14, to a connecting position where the second phase connectors 17 extend through coupling end 14 toward the first phase connectors 16 so as to connect thereto, as shown in FIG. 6.

With reference to the FIGS. 2-6, both coupling ends 13, 14 of the cases 11, 12 are provided with relevant gates 18, 19. The first gate 18 is abutting against the flange 25 and is shaped to close the aperture of the first coupling end 13. Sealing rings 28 provide water tightness between the first gate 18 and the flange 25.

Preferably, the first gate 18 is arranged in an axially external position with respect to the first case 11.

The first gate 18 is connected to the first coupling end 13 of the first case 11 by means of a first hinge 15a and is kept closed by a securing fitting 20, hereinafter described.

The second gate 19 is arranged in an internal position with respect to the second flange 35 and sealing rings 29 provide water tightness between the gate 19 and the flange 35. The second gate 19 is connected to the second coupling end 14 of the second case 12 by means of a second hinge 15b and is kept closed by securing fittings 21, hereinafter described and shown in FIGS. 7-9).

The first gate 18 has shape similar to that of the aperture of the flange 35 of the second coupling end 14—preferably circular—and dimension smaller than that of said aperture so that, when the first and second coupling ends 13, 14 are adjoined, the first gate 18 and its securing fitting 20 and first hinge 15a are housed within the aperture of the second flange 35 of the second coupling end 14.

Upon coupling of the cases 11 and 12, the projection of the first gate 18 into the aperture of the second flange 35 brings gate 18 as close to the second gate 19 as permitted by the securing fitting 20, so as to leave a narrow hollow space between the gates 18 and 19. Consequently, when the two cases 11 and 12 are coupled together, only a small amount of water remains entrapped in the hollow space between the gates 18 and 19.

The amount of water entrapped between the gates 18 and 19 can be further reduced by covering the outer surface of one or both the gates 18, 19 with a spongy layer or with bubble wrap or bubble pack or the like.

Figure 4:
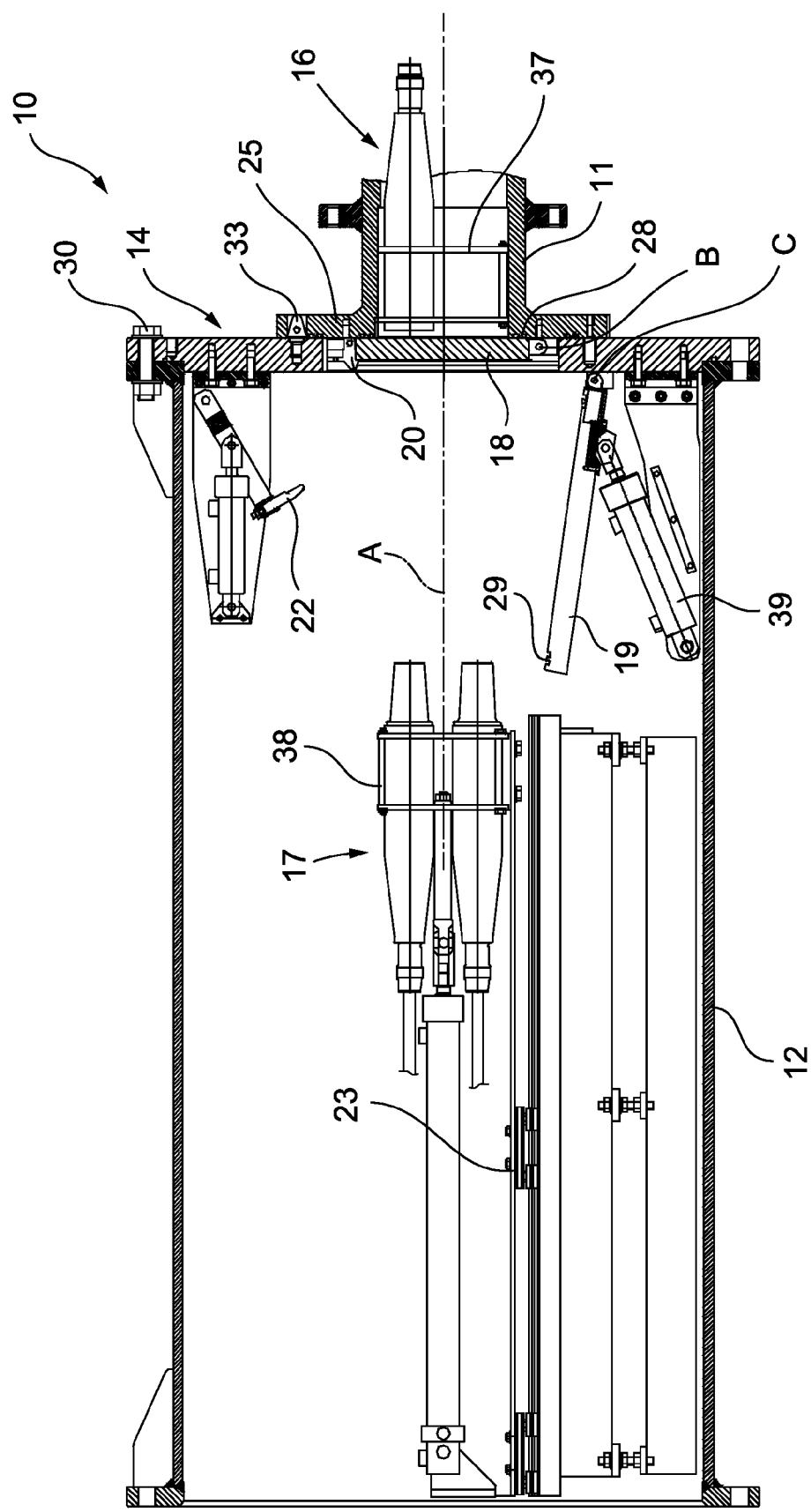
Figure 5:
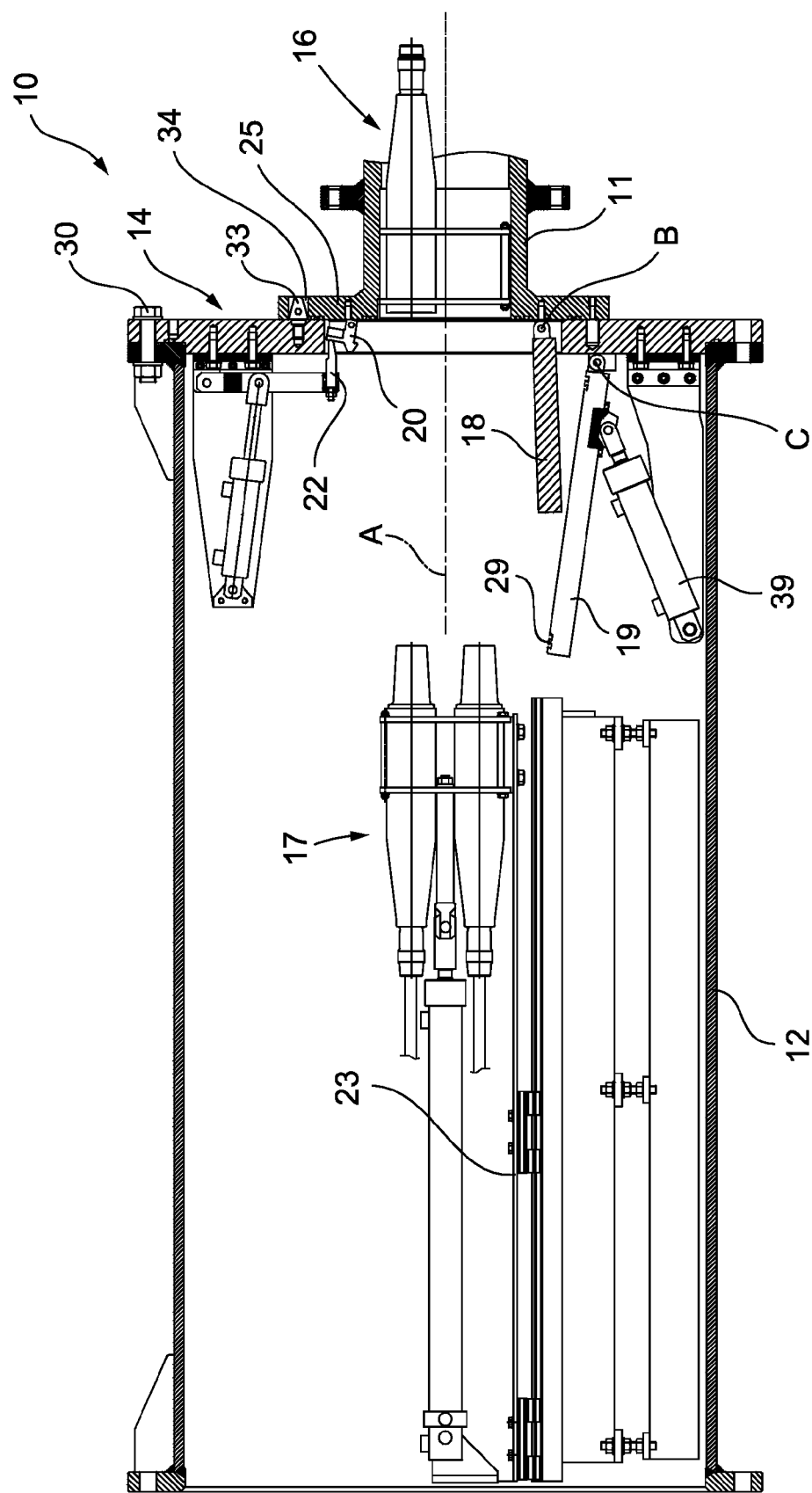

As shown, for example, in FIGS. 4 and 5, both the first and the second gates 18, 19 are pivotable around pivoting axes B, C orthogonal to the longitudinal axis A of the connection assembly 10. Both the gates 18, 19 pivot in the same direction, moving inside the second case 12.

Both the first and the second gates 18, 19 are movable from closing positions, in which the cases 11 and 12 are watertight closed, to an opening position, where the connecting interface is open for allowing the connection of the phase connectors 16, 17.

The wet mateable connection assembly 10 comprises operable securing fittings 20, 21 for keeping the gates 18, 19 watertight closed and, when released, allowing opening of the relevant the gates 18, 19.

In particular, the securing fitting 20, associated with the first gate 18, comprises a pivoting clip, hinged to the first flange 25, urged against the gate 18 by means of a spring or the like (not shown).

The securing fittings 21, associated with the second gate 19, are arranged around the second gate perimeter and are described in better detail in the following, in connection with FIGS. 7, 8 and 9.

The second case 12 comprises a pushing actuator 22, acting on the pivoting clip of the securing fitting 20 associated with the first gate 18. The pushing actuator 22 is movable from a non-working position, shown in FIGS. 3, 4, to a working position urging against the pivoting clip, causing it to disengage from the gate 18, allowing its opening, for example by effect of its weight, as shown in FIGS. 5, 6 when the second gate 19 has been opened.

The opening of the first gate 18 can be eased by the presence of a spring (not illustrated) provided in position diametrically opposed to the pivoting axis B and compressed between the inner surface of the first gate 18 and the outer surface of the first coupling end 13 so that it provides a thrust to the gate 18 following the pressing on the pivoting clip of the securing fitting 20 by the pushing actuator 22. The presence of said spring is particularly advantageous when the first case 11 is in a position other than substantially horizontal.

The second case 12 comprises a lifting actuator 39 acting on the second gate 19 and, indirectly, on the first gate 18 to bring them in vertical position for closing after unmating.

Figure 8:
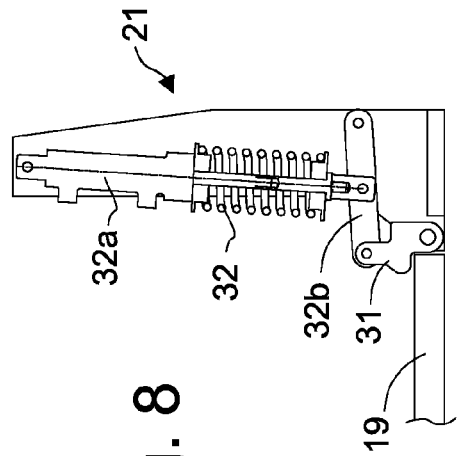
FIGS. 7-9 are views of securing fittings associated with the gates of the wet mateable connection assembly according to the invention.
Figure 9:
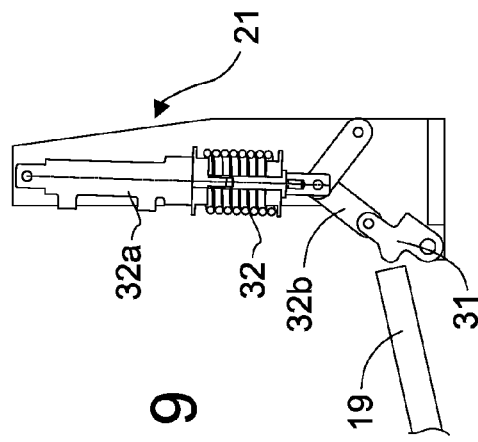
Figure 7:
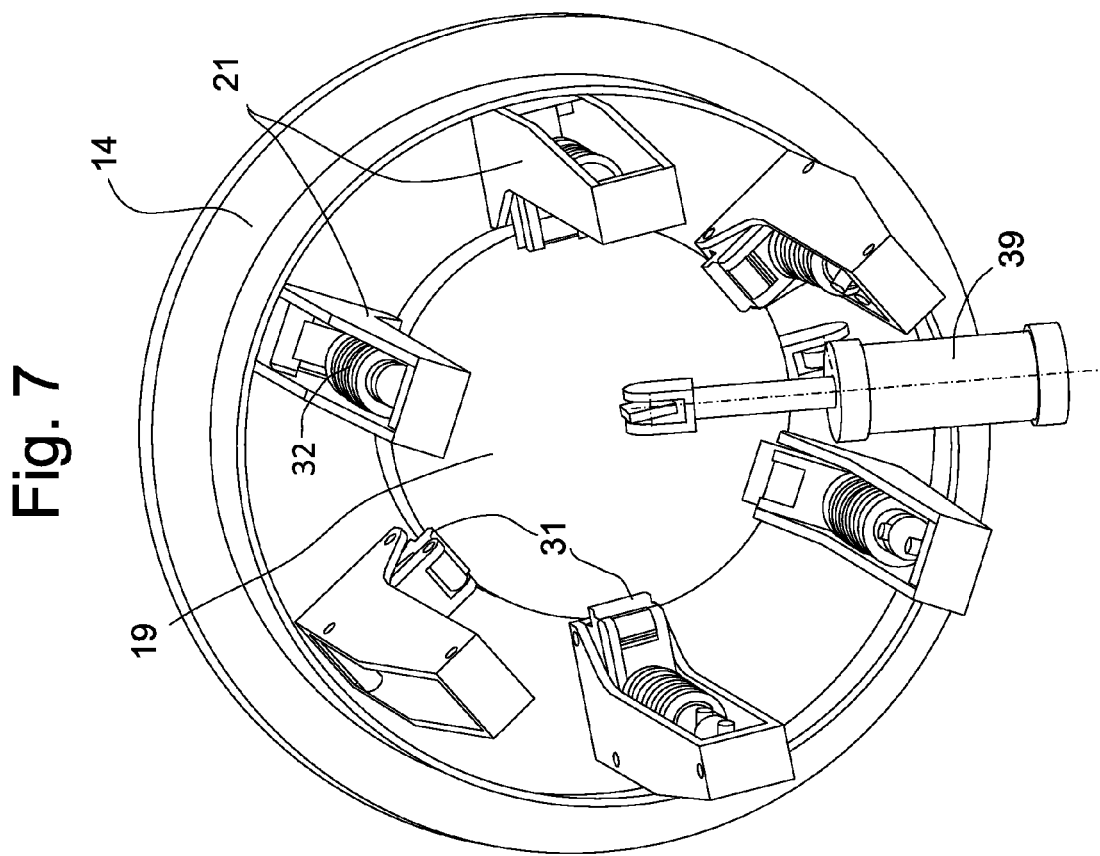

The securing fittings 21, shown in FIGS. 7, 8, 9, are arranged inside the second case 12 and comprise each a pusher lever 31 associated with a spring 32.

In particular, the pusher lever 31 is movable from a first position acting against the second gate 19 (FIG. 8), to a second position allowing the pivoting of the second gate 19, (FIG. 9). The movement of the pusher lever 31 is enabled by a relevant spring actuator 32a, acting on the pusher lever 31 through a couple of articulated rods 32b.

When watertight case 12 is not mated, its second gate 19 is exposed to water pressure acting in its opening direction. Accordingly a suitable number of securing fittings 21 is provided for bearing such pressure and provide the required tightness.

The articulated rods 32b ensure that the sealing of the gate 19 is maintained in the presence of outer pressure even with a limited load applied by the spring actuator 32a.

Vice versa, when watertight case 11 is not mated, its first gate 18 is urged against the flange 25 by the water pressure; consequently, only one securing fitting 20 may be sufficient for providing the required tightness.

The second phase connectors 17 are arranged in the movable cage 38, sliding on the bearing structure 23 acted by the coupling actuator 23a. The guide handle 26 of the first case 11 has a U or V shape or any other shape suitable for guiding the case in suspension along a rope for installation.

Figure 10:
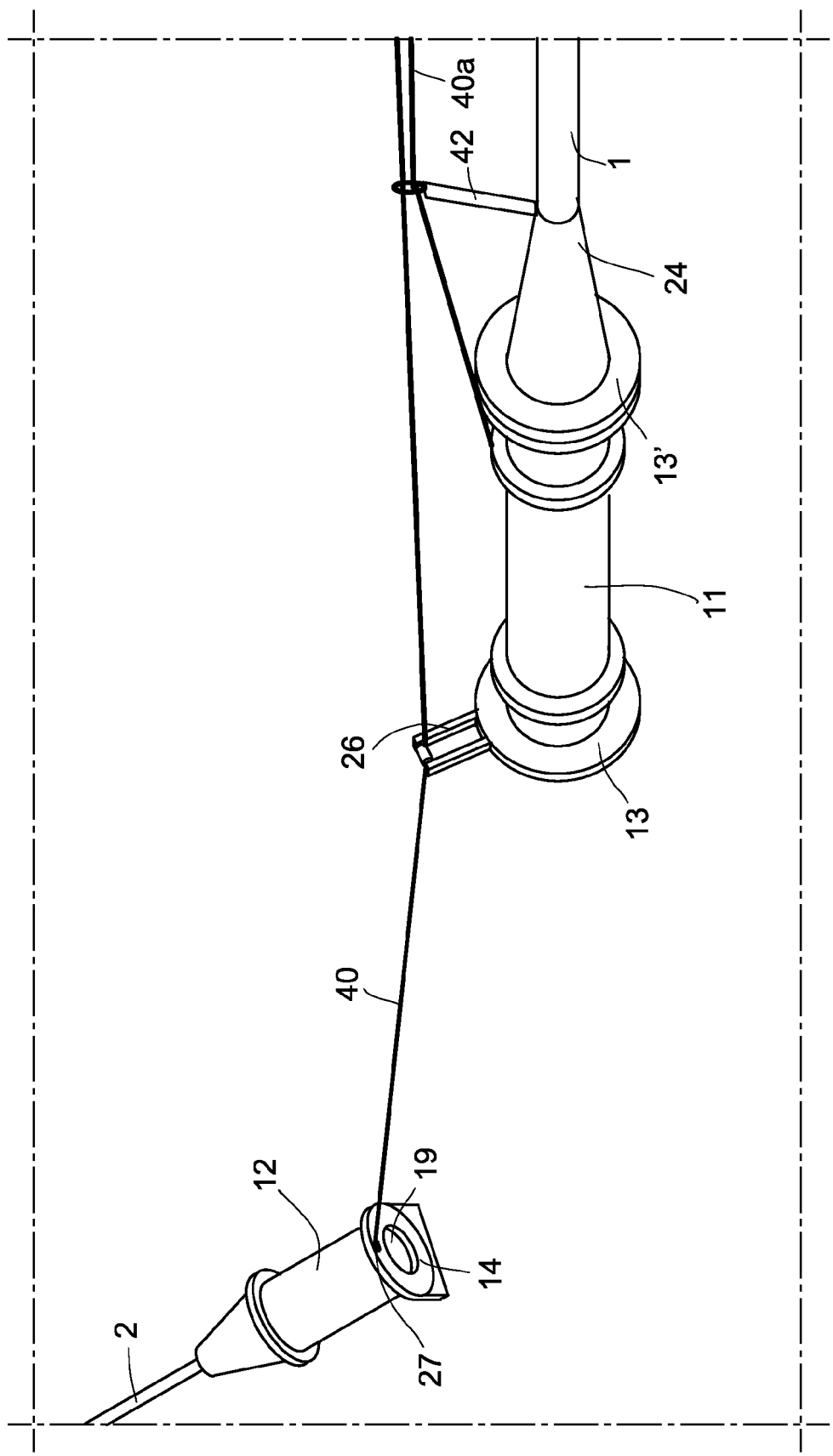
FIGS. 10-12 are perspective views of the steps of the placing method of the wet mateable connection assembly according to the present invention.

As from FIG. 10, during installation, the first case 11 slides along a guiding rope 40 connected to the seat 27 of the second case 12 at one end and attached to the installation vessel at its other end, until the first case 11 reaches the second case 12.

Upon engagement of guide handle 26 and seat 27, the seat 27 acts as pivoting point for the first case 11 with respect to the second case 12.

An auxiliary rope 40a can be advantageously provided, having one end connected, for example, at or in the vicinity of the opposite end 13' of the first case 11, while the other end can be on the installation vessel. A suspender 42 can be provided, for example, at one end of the bend stiffener 24, to engage one or, preferably, both the guiding rope 40 and the auxiliary rope 40a, when the latter is present.

Figure 11:
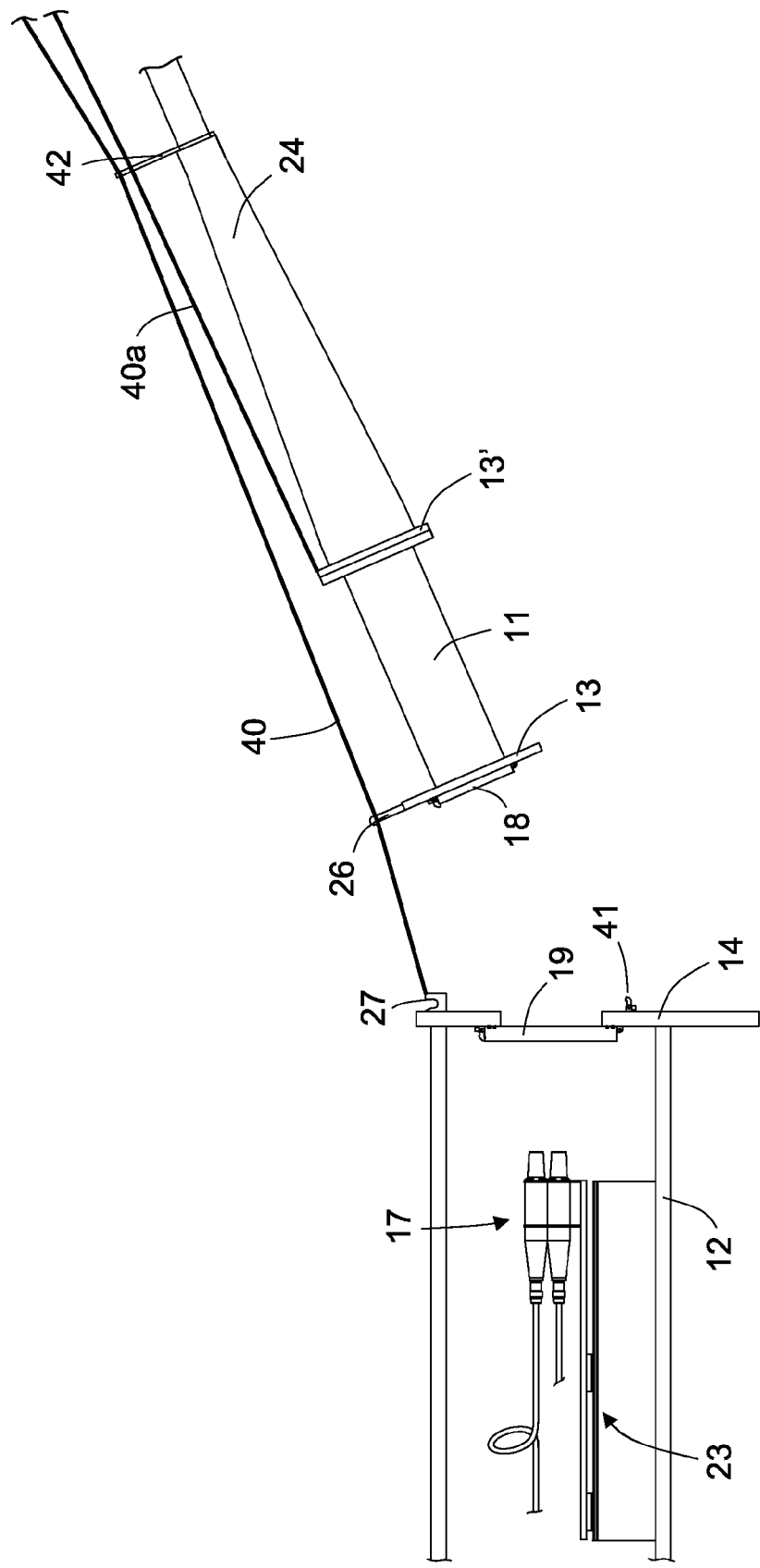
Figure 12:
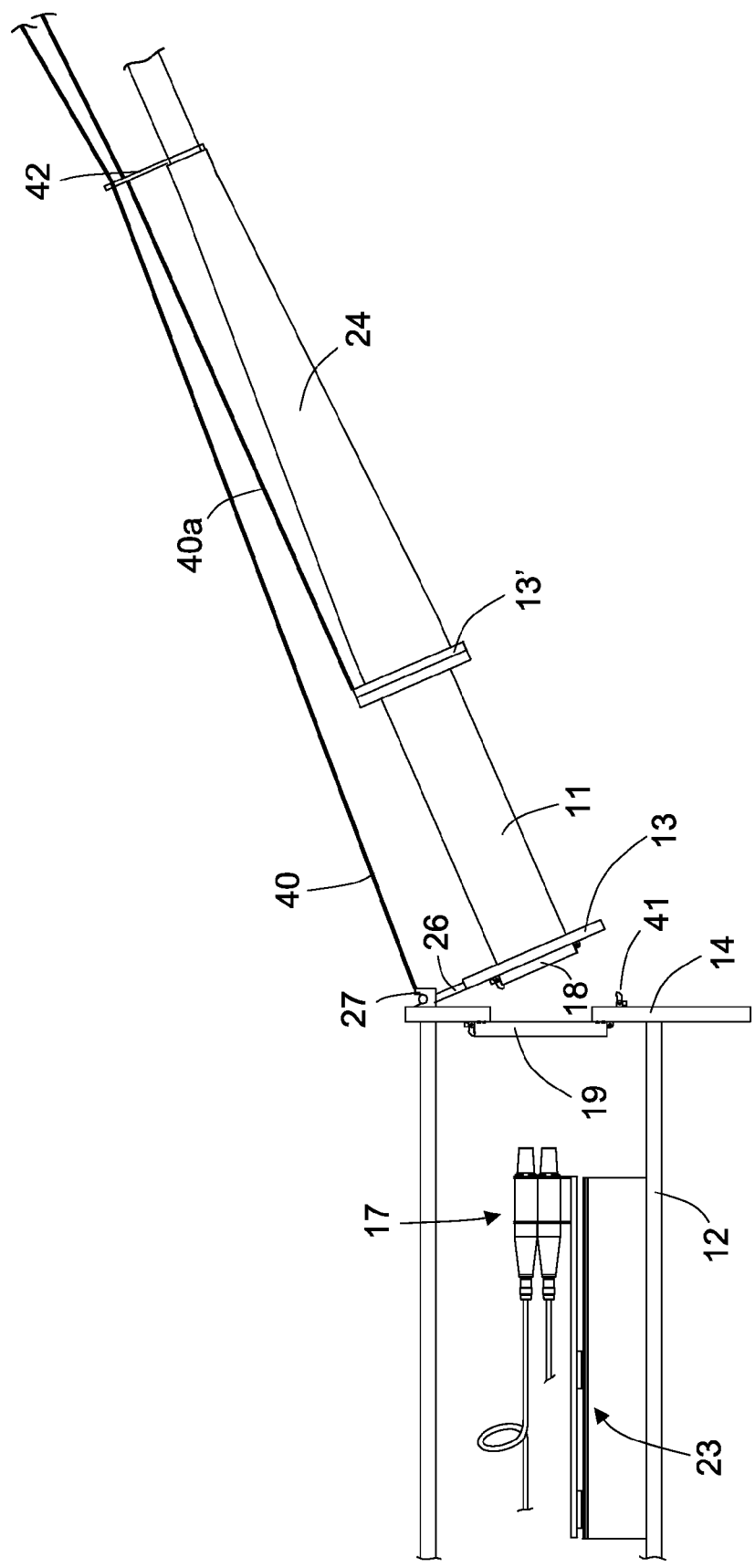

The pivoting movement of the first case 11 with respect to the second case 12 is shown on FIGS. 11-12.

Conveniently, the second flange 35 of the second case 12 comprises a plurality of conical centering studs 33, suitable to couple with corresponding stud seats 34 (shown in FIG. 5) of the first flange 25, and easing self-alignment of the first case 11 with respect to the second case 12.

The second flange 35 can further comprise a locking clip 41 positioned to engage the first flange 25 at its rim. In the case depicted in FIGS. 1, 2, 11 and 12, the locking clip 41 is in a position opposite to the seat 27.

Once the alignment and coupling between cases 11 and 12 has been obtained, the cases 11, 12 are fixed to each other by bolts 30, tightened either by operators or automatic actuators or robots, as hereinafter described.

When installing a power underwater link, for example for wind mills installation, power cable/s connected to the second case 12 are deployed on the seabed.

As from FIG. 10, the rope 40 is connected to the seat 27 and its free end is kept reachable, for example, by means of a buoy. Alternatively, at the time of installation, one end of the rope 40 is attached to the seat 27 by a remotely operated underwater vehicle (ROV) when mating is to be made, while the other end of the guiding rope 40 is kept at the water surface by means of a buoy or on the installation vessel.

The guiding rope 40 acts as a guide for the first case 11 until, as shown in FIGS. 11 and 12, it reaches a position close the second case 12 and the guide handle 26 engages with the seat 27 without intervention of any remotely operated vehicle.

Starting from this engaged position the first case 11 pivots around the seat 27, as from FIG. 12, until the two cases 11, 12 are aligned along the connecting axis A and the two coupling ends 13, 14 are in reciprocal contact, with the help of conical centering studs 33 and stud seat 34. The locking clip 41 engages the lower rim of the first flange 25 securing the adherence of the first case 11 to the second case 12, before the fixing by bolts 30.

After that, the two aligned cases 11, 12 are fixed to each other to realize a watertight connection. The cases 11, 12 are not permitted to move reciprocally.

Such operation can be made by a remotely operated underwater vehicle (ROV) bearing a suitably arranged robot, or by an operator when the laying depth so permits.

When watertight connection has been performed, the securing fittings 21, associated with the second gate 19, are remotely operated, for example by a low voltage power feed line brought by the ROV, for opening the second gate 19 that rotates inward within the second case 12. The small volume of water remained entrapped between gates 18, 19 during the fixing of the cases 11, 12 flows down on the gate 19 and/or the floor of the case 12, leaving the connecting interface substantially dry.

The pushing actuator 22 acts on the securing fittings 20 of the first gate 18 which pivots inside the second case 12.

The bearing structure 23 is remotely operated to move the second phase connectors 17 towards and after the connecting interface until engagement with the relevant first phase connectors 16. The length of cable 2 housed with the second case 12 allows such movement.

The various actuators of the second case 12 are preferably hydraulic actuators, powered by a hydraulic unit (not shown), powered by a low voltage (e.g. 220V) power supply, independently brought to the second case 12 for mating or unmating operation.

In case of unmating, the above outlined procedure is followed substantially on reverse, by sending a ROV to the connection 10 for bringing power to the system.

The closing of the first and the second gates 18, 19 is performed by the remotely operated lifting actuator 39 pushing up the second gates 19 that, in turn, pushes up the first gate 18. The two gates 18, 19 get at reach of the respective securing fittings 20, 21 that suitably fasten them, restoring the independent water tightness of the cases 11 and 12, which can then be detached after removal of the bolts 30 by a ROV or by an operator.

The wet mateable connection assembly as described allows a dry connection also in an undersea condition, with no need of insulating fluid. The wet mateable connection assembly according the present invention is simple, economical and functional.

The materials used, as well as their dimensions, may be of suitable type depending on the technical requirements of the specific installation.

The invention claimed is:

1. A wet mateable connection assembly comprising:
   at least one first and a second watertight case mateable to each other in a watertight manner, the first and the second case having respective first and second gates at respective first and second coupling ends;
   at least one first phase connector arranged inside said first case; and
   at least one second phase connector arranged inside said second case, wherein the first gate is movable inwardly to the second case.

2. The wet mateable connection assembly according to claim 1, wherein said first phase connector is fixed facing the first coupling end, and the second phase connector is movable from a distal position, where the second phase connector is spaced from the second coupling end, to a connecting position where the second phase connector extends through the second coupling end to reach said first phase connector.

3. The wet mateable connection assembly according to claim 1, wherein the first coupling end is provided with a first gate movable around a pivoting axis substantially orthogonal to a longitudinal connecting axis.

4. The wet mateable connection assembly according to claim 3, wherein both coupling ends are provided with, respectively, a first gate and a second gate movable around a pivoting axis substantially orthogonal to the longitudinal connecting axis.

5. The wet mateable connection assembly according to claim 1, wherein the first gate is arranged in an axially external position with respect to the first case.

6. The wet mateable connection assembly according to claim 4, wherein the second gate is arranged in an axially internal position with respect to the second case.

7. The wet mateable connection assembly according to claim 4, wherein the first and second gates are pivotable in a same axial direction, orthogonal to the connecting axis.

8. The wet mateable connection assembly according to claim 1, wherein each case comprises respectively first and second securing fittings keeping said gates watertight closed and operable for making the gates opened.

9. The wet mateable connection assembly according to claim 1, comprising a pushing actuator arranged inside said second case.

10. The wet mateable connection assembly according to claim 1, wherein said second phase connector is mounted on a bearing structure inside said second case.

11. The wet mateable connection assembly according to claim 1, wherein each phase connector is mechanically and electrically connected with an electric or optical or hybrid cable.

12. The wet mateable connection assembly according to claim 1, wherein said first phase connector is immersed in a curable material.

13. The wet mateable connection assembly according to claim 1, comprising a bend stiffener fixed to an opposite end of said first case.

14. The wet mateable connection assembly according to claim 1, wherein said coupling end of said first case comprises a guide handle protruding substantially perpendicularly with respect to the connecting axis.

15. The wet mateable connection assembly according to claim 14, wherein said guide handle has a shape suitable for guiding said first case in suspension along a guiding rope.

16. The wet mateable connection assembly according to claim 1, wherein the second coupling end comprises a seat.

17. The wet mateable connection assembly according to claim 1, wherein said second coupling end comprises a second flange with at least two centering studs and wherein the first end comprises a first flange and at least two stud seats.

18. The wet mateable connection assembly according to claim 1, comprising a plurality of sealing rings between said first and second coupling ends and said first and second gates.

19. The wet mateable connection assembly according to claim 1, wherein said first and second cases are fixed to each other by bolts.

20. The wet mateable connection assembly according to claim 1, wherein the second coupling end comprises a locking clip.

21. A method for underwater connecting two cable ends, comprising:
   providing at least one first phase connector in a first watertight case comprising a first gate at a first coupling end;

providing at least one second phase connector in a second watertight case comprising a second gate at a second coupling end;

securing said second case to said first case in a watertight manner by said respective first and second coupling ends;

opening the second gate, then the first gate, the first gate being opened by moving inwardly to the second case; and axially moving said second phase connector so as to engage said first phase connector and operatively couple thereto.

* * * * *